US006523784B2

United States Patent
Steinsiek et al.

(10) Patent No.: US 6,523,784 B2
(45) Date of Patent: Feb. 25, 2003

(54) ARRANGEMENT FOR RECOVERING SPACECRAFT

(75) Inventors: Frank Steinsiek, Bremen (DE); Hansjuergen Guenther, Bremen (DE); Bernd Bischof, Ganderkesee (DE)

(73) Assignee: Astrium GmbH, Ottobrunn (DE)

( * ) Notice: Subject to any disclaimer, the term of this patent is extended or adjusted under 35 U.S.C. 154(b) by 0 days.

(21) Appl. No.: 09/957,802

(22) Filed: Sep. 21, 2001

(65) Prior Publication Data

US 2002/0063188 A1 May 30, 2002

(30) Foreign Application Priority Data

Sep. 22, 2000 (DE) .......................... 100 47 518
Dec. 1, 2000 (DE) .......................... 100 59 914

(51) Int. Cl.[7] .............................................. B64G 1/64
(52) U.S. Cl. ........................................ 244/161; 294/97
(58) Field of Search ............................ 244/158 R, 161, 244/164; 294/97

(56) References Cited

U.S. PATENT DOCUMENTS

| | | | | |
|---|---|---|---|---|
| 1,317,500 A | * | 9/1919 | Holmquist | .................... 294/97 |
| 4,219,171 A | * | 8/1980 | Rudmann | .................... 244/161 |
| 4,588,150 A | | 5/1986 | Bock et al. | |
| 4,929,009 A | * | 5/1990 | Vandersluis et al. | ........ 244/161 |
| 4,929,011 A | * | 5/1990 | Vandersluis et al. | ........ 244/161 |
| 5,109,749 A | | 5/1992 | Olcer | |
| 6,017,000 A | * | 1/2000 | Scott | ....................... 244/158 R |
| 6,354,540 B1 | * | 3/2002 | Lewis et al. | ................ 244/161 |

FOREIGN PATENT DOCUMENTS

| | | | | |
|---|---|---|---|---|
| DE | 3215229 | | 1/1989 | |
| DE | 3901882 | | 4/1990 | |
| DE | 19846327 | | 3/2000 | |
| GB | WO 93/09054 | * | 5/1993 | ............. B66C/1/62 |

* cited by examiner

*Primary Examiner*—Peter M. Poon
*Assistant Examiner*—Timothy D Collins
(74) *Attorney, Agent, or Firm*—W. F. Fasse; W. G. Fasse

(57) ABSTRACT

A recovery craft with a coupling arrangement captures, engages, and transports a defective or expended non-maneuverable spacecraft. The coupling arrangement includes a coupling mast (e.g. a telescoping pipe), a releasable rigid mount that secures one end of the coupling mast to the recovery craft, and spreader arms that are radially spreadable from the other end of the coupling mast. The spreader arms are initially radially inwardly retracted, and are inserted into an interface ring of the spacecraft. Then the spreader arms are radially outwardly extended to engage behind a protruding rim of the interface ring. A spring braces against the spacecraft. Next, the rigid mount is released and the coupling mast remains connected to the recovery craft only by a tension-transmitting cable. Thrusters of the recovery craft are activated to tow the spacecraft to a new target position, orbit, or trajectory.

15 Claims, 3 Drawing Sheets

ARRANGEMENT FOR RECOVERING SPACECRAFT

PRIORITY CLAIM

This application is based on and claims the priority under 35 U.S.C. §119 of German Patent Applications 100 47 518.3, filed on Sep. 22, 2000 and 100 59 914.1, filed on Dec. 1, 2000, the entire disclosures of which are incorporated herein by reference.

FIELD OF THE INVENTION

The invention relates to an arrangement for capturing and recovering spacecraft, as well as transporting the recovered spacecraft in orbit, returning the spacecraft to earth, or leading the spacecraft into a targeted destruction through re-entry and burning-up in the earth's atmosphere, by means of a powered recovery craft, preferably in the form of a satellite equipped with a coupling mechanism between the recovery craft and the spacecraft to be recovered.

BACKGROUND INFORMATION

There are several situations in which it becomes necessary or desirable to recover, capture and transport a defective or expended satellite. For example, it may be necessary or desired to move the spacecraft to a different orbit or trajectory, or lead the spacecraft into a return to earth, or to a guided and targeted destructive re-entry trajectory that will ensure a complete destruction of the spacecraft by burning-up in the earth's atmosphere, or by returning to earth at an impact location in an ocean or in an uninhabited land area.

Recovery measures are necessary when the position and orbit or trajectory of the defective or expended spacecraft would possibly impair or endanger the optimal operation of some other spacecraft or space system. A defective spacecraft may have a negative influence on other spacecraft or satellite systems, for example, if the defective satellite has not reached its original intended target position in an intended orbit, or has drifted out of that intended position, and as a result, the defective satellite is positioned in a reception and transmission zone of other systems and thus interferes with these other systems through its electromagnetic characteristics or a simple shading effect.

Recovery measures are also necessary if a spacecraft is in a decaying orbit and will re-enter the earth's atmosphere in a manner whereby parts of the spacecraft, which have not completely burned-up in the earth's atmosphere, will crash or impact onto the earth in inhabited areas, thereby possibly endangering persons and property. In other words, a dangerous uncontrolled partial incineration of the defective spacecraft in the earth's atmosphere arises if the spacecraft follows a re-entry path with an improper re-entry angle, so that a complete burning-up or incineration of the spacecraft in the atmosphere cannot be achieved. In this case, it is possible that the spacecraft or parts thereof will impact the earth at an undesired impact location, which would endanger persons and property.

All of the above problems can be avoided through the appropriate capture, recovery and repositioning or transporting of the defective or expended spacecraft. Throughout this specification, the term spacecraft refers to satellites, space stations and components thereof, launch vehicles, orbiter vehicles, orbiting "space junk", or any other body orbiting or flying in space.

It has been found in practice, that it is rather complicated and costly to capture, recover and transport-away defective spacecraft or spacecraft that have reached the end of their service life, such as rocket parts, burned-out rocket stages, satellites, space station elements and the like. Previously it has not been possible to recover and transport spacecraft that are themselves not maneuverable, without direct human intervention and active control. It has been especially difficult to achieve the actual capture and coupling of the defective or expended spacecraft to the recovery craft. The known coupling measures require complex, high-precision positioning and engagement of the respective coupling means, which is rather difficult to achieve in practice.

U.S. Pat. No. 6,017,000 (Scott) discloses an apparatus and methods for coupling a satellite or other spacecraft to a powered recovery craft. The coupling mechanism is designed and constructed to couple the two spacecraft to each other only in relation to a high-precision close approach or proximity operation of the recovery spacecraft to the defective spacecraft. It is not possible to achieve coupling in the event of substantial deviations or distances between the two spacecraft.

German Patent 32 15 229 discloses a coupling apparatus for guiding and connecting together two spacecraft, while being able to achieve a coupling even in the event of certain deviations of position or alignment between the two spacecraft. Namely, the disclosed apparatus compensates deviations within a certain spatial angular range as well as a relative offset or shifting, by means of funnel arrangements and springs. The disclosed coupling apparatus includes a coupling funnel with a locking trap at the bottom of the funnel on one spacecraft, and a telescoping rod having a head piece provided with a catch or detent pawl that is extendable from the second spacecraft. The telescoping rod is supported by springs, a light emitting device is arranged on the funnel floor or bottom, and an optical sensor is provided on the head piece of the telescoping rod, whereby the light emitting device and the optical sensor cooperate to provide signals for controlling the orientation of the telescoping rod relative to and into the coupling funnel. The disclosed arrangement is not suitable for taking up and transmitting substantial tension forces between the two spacecraft.

Other conventionally known spacecraft recovery systems mostly rely on robot elements such as gripper mechanisms for coupling onto the spacecraft that is to be recovered. Such robot elements must be precisely guided to the target coupling location and must also compensate for dynamic relative movements and oscillations. This generally requires a complex computer-supported regulation and control circuit, which must in turn be monitored and influenced or steered from the ground control station.

SUMMARY OF THE INVENTION

It is an object of the invention to provide a structurally simple, universally applicable coupling arrangement of the above described general type, in order to achieve an efficient and economical handling and operation thereof, as well as enabling the transmission of tension forces therethrough for transporting a second spacecraft with a first spacecraft. It is another object of the invention to provide a robust, trouble-free, simple structure that achieves automatic self-alignment for carrying out the coupling within a large tolerance or deviation range. The invention further aims to avoid or overcome the disadvantages of the prior art, and to achieve additional advantages, as apparent from the present specification.

The above objects have been achieved according to the invention in a system including a first spacecraft, a second spacecraft, and a coupling arrangement for coupling together the two spacecraft. According to the invention, the coupling arrangement is improved in that it comprises a mast-like holding element (or coupling mast), which is connected to the first spacecraft by a (releasable mount provided at a first end of the holding element, and that captures, engages and is connected to the second spacecraft by movable or adjustable spreader elements in the form of at least three spreader arms provided at or proximate to a second end of the holding element. In this context, "proximate to the second end" means, for example, within one third of the total length of the holding element from the termination of the second end thereof. The spreader elements are controlledly movable, to be selectively moved between a retracted condition and an extended condition.

In the retracted condition, the spreader arms are pivoted relatively radially inwardly toward the extension axis of the holder element. On the other hand, in the extended condition, the spreader arms are spread radially outwardly from the extension axis of the holder element, so as to engage into a corresponding interface ring provided on the second spacecraft, i.e. the spacecraft to be recovered. In the deployed, extended or spread-out condition, the spreader elements reach and engage into a recess and/or behind an overhanging rim of the interface ring so as to establish especially a tension-transmitting connection. A spring arrangement braces against the second satellite, especially in a direction parallel to the lengthwise axis of the holder element, for fixing the spreader elements into the interface ring by means of an elastic spring-biased bracing effect.

The invention provides a simple embodiment of a capture and arresting apparatus, for achieving a coupling of a recovery craft to a spacecraft that is to be recovered. In comparison to conventional recovery systems using grippers or other coupling means, the inventive coupling system has the advantage of a mechanically simple and thus trouble-free and interference-free construction.

In order to achieve a good adaptation and compensation of a rather large range of deviations or mis-alignments between the two spacecraft, the invention provides that the coupling head including the spreader elements is essentially self-centering and self-aligning in the interface ring, and that a large distance between the two spacecraft can be bridged and coupled because the mast-like holder element comprises an extendable telescoping pipe. The telescoping action of the inner pipe and outer pipe can also automatically pivotally spread out and thereby deploy the spreader elements that couple into engagement with the interface ring.

To ensure a well-controlled positioning and coupling of the coupling head into the interface ring, the holder element is initially rigidly connected to the recovery craft by a releasable rigid mount. On the other hand, in order to decouple the body dynamics of the two spacecraft from each other, the rigid mount is released from the recovery craft after the coupling connection has been established. Thereby, the holder element is no longer rigidly mounted or connected to the recovery craft. Instead, an extendable cable arrangement or the like provides a flexible tension-transmitting connection between the coupling arrangement and the recovery craft, without transmitting any forces other than direct tension forces. To achieve a simple release or decoupling, the connection of the holder element to the recovery craft can be provided by pyrotechnically explodable bolts or the like, or any releasable connectors.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

Figure 1:
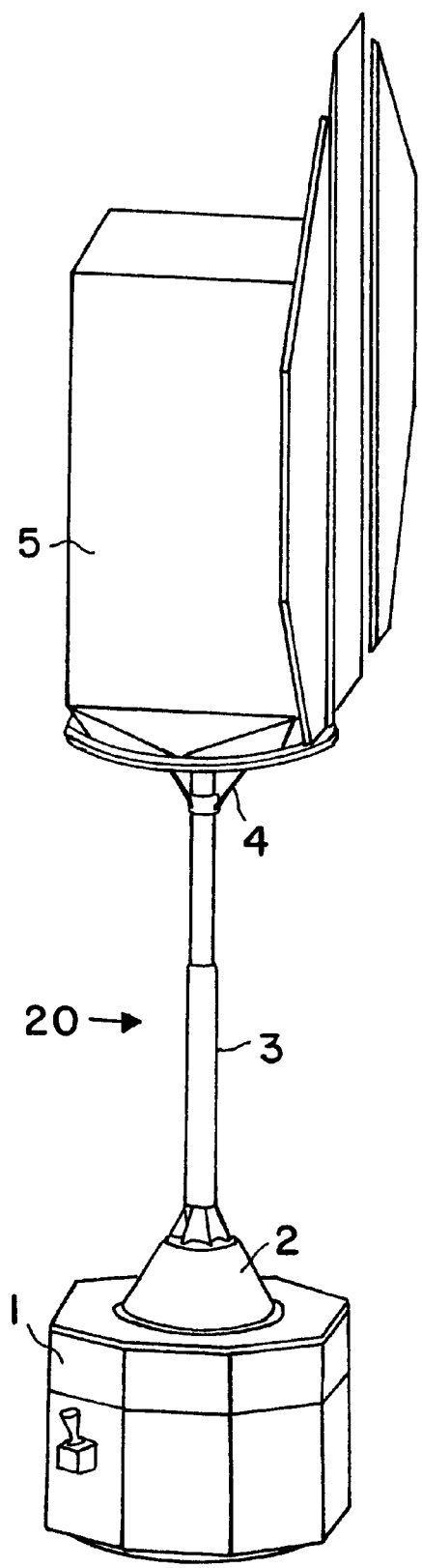
FIG. 1 is a schematic perspective overview of a recovery craft coupled to a spacecraft that is to be recovered.

FIG. 1 shows a recovery craft 1 in the form of a satellite, coupled by a coupling arrangement 20 to a spacecraft 5 that is to be recovered. More particularly, the coupling arrangement 20 includes a coupling mast or holder element 3, of which a first end is connected to the recovery craft 1 by means of a rigid releasable mount 2, and of which a second end thereof is connected to the spacecraft 5 to be recovered. Namely, the second end of the holder element 3 is provided with adjustably spreadable or extendable spreader elements 4 including at least three spreader arms 4 that are brought into engagement with the spacecraft 5 that is to be recovered.

Figure 2:
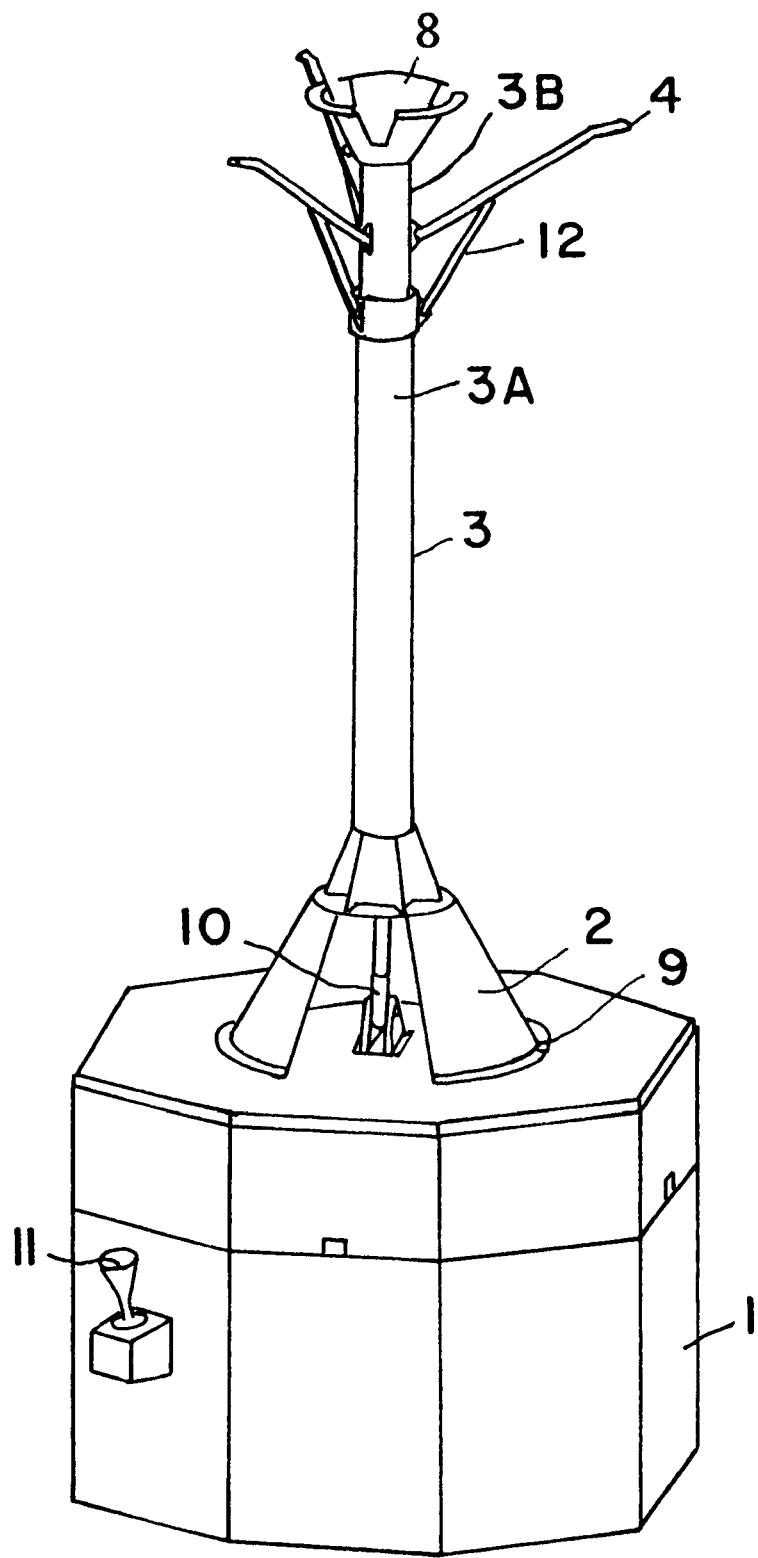
FIG. 2 is an enlarged perspective view of the recovery craft and its coupling arrangement including extended coupling elements.

Referring to FIG. 2, the capture mast or holder element 3 is preferably in the form of a telescoping pipe 3 including an inner pipe 3B that is telescopingly slidable into and out of an outer pipe 3A. The telescoping pipes 3A and 3B thus form a holder element 3 that has an adjustable length while being substantially rigid. In this context, the term "substantially rigid" does not require absolute rigidity, but rather involves a resistance to bending forces and the like, with a tendency to remain in a straight linear extending configuration, and a tendency to return to such a straight linear extending configuration if deflected out of this configuration. The inner pipe 3B is slidably extendable from the outer pipe 3A in a controlled, power-driven manner, by any conventionally known actuating or driving mechanism. The selected telescopic extension of the inner pipe 3B relative to the outer pipe 3A achieves a length adjustment of the overall holder element 3, and/or achieves the radially outward spreading deployment of the spreader arms 4 as will be discussed below.

Figure 3:
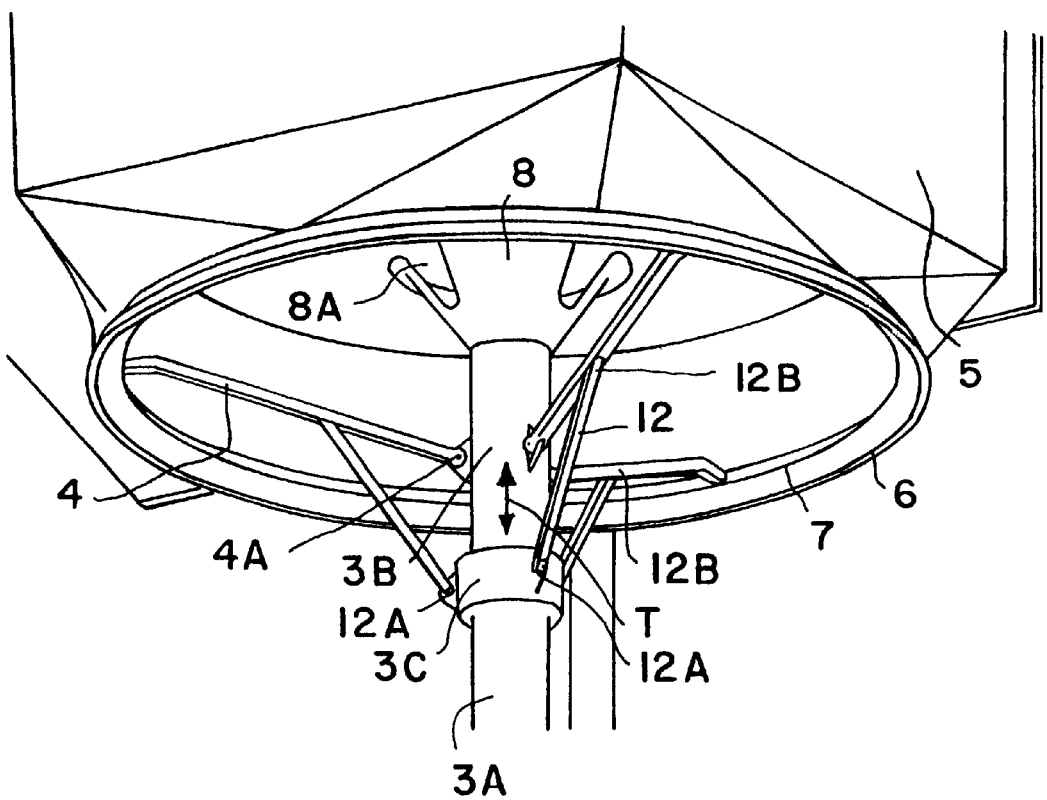
FIG. 3 is an enlarged detail view of the coupling head arrangement that couples to the spacecraft that is to be recovered.

As can further be seen in greater detail in FIG. 3, the spreader arms 4 are each respectively connected to the inner pipe 3B by respective pivot joints 4A. Additionally, pivot struts 12 are respectively articulately connected between a central body portion of each respective spreader arm 4 and a collar 3C of the holder element 3. Particularly, each pivot strut 12 is connected at a first end via a pivot joint 12A to the collar 3C, and at a second end via a pivot joint 12B to a central body portion of a respective spreader arm 4. With this arrangement, a relative axial sliding displacement of the pivot joints 4A on the inner pipe 3B relative to the pivot joints 12A on the collar 3C will achieve a variable radially outward spreading deployment of the spreader arms 4. References to "axial" and "radial" directions are in relation to the axial extension direction of the elongated holder element 3. Such an axial displacement can be achieved in two different ways or embodiments.

In a first embodiment, the collar 3C is fixed to the outer pipe 3A (e.g. forms a part of the outer pipe). In this arrangement, extending the inner pipe 3B from the outer pipe 3A in a telescoping fashion (as indicated by the double-headed arrow T) will move the pivot joints 4A further away from the collar 3C with the pivot joints 12A, whereby the pivot linkage formed by the pivot struts 12 causes the spreader arms 4 to spread radially outwardly away from the axis of the holder element 3. On the other hand, telescopingly sliding the inner pipe 3B into the outer pipe 3A will have the effect of pivoting the spreader arms 4 radially inwardly toward the axis of the holder element 3 and pointing substantially axially along the axis of the holder element 3 away from the recovery craft 1.

In a second embodiment of effecting the radial spreading deployment of the spreader arms 4, the collar 3C is axially slidable along the inner pipe 3B and/or the outer pipe 3A, or in general along the holder element 3. Thereby, an axial sliding displacement of the collar 3C toward the recovery craft 1 will cause a radial outward spreading of the spreader arms 4, while an axial sliding of the collar 3C away from the recovery craft 1 will cause a radial inward pivoting of the spreader arms 4 closer to the axis of the holder element 3. With such a slidable collar 3C, the radial spreading deployment of the spreader arms 4 can be independent of the telescoping adjustment of the pipes 3B and 3A of the holder element 3 (or the telescoping embodiment can be omitted in an alternative embodiment). The collar 3C may be controlled and driven in a sliding manner using any conventionally known actuator means.

The adjustable spreading deployment of the spreader arms 4 is appropriately controlled to selectively bring the spreader arms 4 into engagement with a corresponding interface ring 6 connected rigidly to the spacecraft 5 that is to be recovered. This interface ring 6 may also be used, i.e. may already be provided on the spacecraft 5, as an interface between the spacecraft 5 and another body, such as its associated docking station, launch vehicle, or the like. In any event, the interface ring 6 includes a radially inwardly protruding or overhanging rim 7 with a recess therebehind. When the spreader arms 4 are radially outwardly extended or deployed into the spread-out position shown in FIG. 3, the radial outward free ends of the spreader arms 4 reach behind the protruding rim 7 of the interface ring 6 so as to engage into the recess therebehind.

A spring arrangement 8 is provided on the end of the inner pipe 3B and is braced in an elastically yielding manner against the spacecraft 5. Thereby, the radially outer free ends of the spreader arms 4 are fixedly held and pressed against the protruding rim 7 of the interface ring 6, i.e. in the recess behind the protruding rim 7 of the interface ring 6. In the illustrated preferred embodiment, the spring arrangement 8 comprises an elastically deflectable cone with slits or notches 8A in the cone sidewalls, so that the cone is split into three independently deflectable cone segments. This segmented cone spring 8 may be made of elastically flexible metal alloy, polymer material or fiber reinforced composite material, for example.

With the inventive arrangement of the coupling head including the spreader arms 4, pivot struts 12, spring arrangement 8, and an axial sliding displacement capability, it is very simple to capture, engage and couple to a spacecraft 5. Initially, the spreader arms 4 are in a radially inward folded condition, in which the spreader arms 4 extend parallel or nearly parallel to the axis of the holder element 3 in a direction pointing away from the recovery craft 1. In this condition (not shown) the radial extension or maximum diameter of the coupling head arrangement is rather small. For example, the spreader arms 4 are each respectively received in and extend through the slits or cut-out notches 8A of the conical spring arrangement 8.

Thus, in order to be able to capture the spacecraft 5, it is merely necessary to maneuver the recovery craft 1 so as to move the substantially rigid holder element 3 such that the outer diameter of the conical spring arrangement 8A moves into the inner space within the interface ring 6. Since the inner diameter of the interface ring 6 is much larger than the outer diameter of the conical spring arrangement 8A, there is a large tolerance for misalignment between the coupling arrangement 20 (particularly the coupling head thereof) and the interface ring 6 of the spacecraft 5. The coupling head does not initially need to be centered within the interface ring 6. As the spreader arms 4 are radially outwardly spreadingly deployed, they will carry out a self-aligning or self-centering function by differentially contacting the inner walls of the interface ring 6 (depending on the non-centered position of the coupling head relative to the interface ring) and then sliding therealong until the outer ends of the spreader arms 4 come uniformly into engagement in the recess behind the protruding rim 7 of the interface ring 6. Thereby the axial center of the coupling head arrangement is automatically centered and aligned with the central axis of the interface ring 6, and then the conical spring arrangement 8 is brought to bear against the spacecraft 5 while exerting a counter-bracing force relative to the engaging force of the ends of the spreader arms 4 against the backside of the protruding rim 7 of the interface ring 6.

After the coupling head arrangement is firmly coupled into the interface ring 6 of the spacecraft 5, as described above, then the rigid connection between the holder element 3 and the recovery craft 1 provided by the releasable mount 2 will be released. For example, the releasable mount 2 in the form of a substantially rigid cone is initially rigidly secured to the recovery craft 1 by pyrotechnically explodable bolts 9. By exploding these bolts 9, the mount 2 is released from the recovery craft 1. This arrangement of the mount 2 is shown especially in FIG. 2. It is further possible to release the mount 2 from the holder element 3 itself by similarly exploding explodable bolts that connect the mount 2 to the end of the holder element 3.

As further shown in FIG. 2, a flexible tension-transmitting arrangement, such as a cable arrangement 10, remains connected to the holder element 3 and the recovery craft 1, even after the release of the rigid mount 2. Thus, once the mount 2 has been released, the cable arrangement 10 carries and transmits all tension loads between the holder element 3 and the spacecraft 1, while being flexible with respect to compression forces and lateral forces relative to the axis of the holder element 3. This ensures that only tension forces will be transmitted between the recovery craft 1 and the spacecraft 5 that is to be recovered.

Once this final coupling condition has been established, then the recovery of the spacecraft 5 can be carried out in a towing manner. Namely, rocket motors or thrusters 11 on the recovery craft 1 are activated as necessary to tow the spacecraft 5 to the intended location or new orbit or trajectory. Through the flexible cable arrangement 10, it is ensured that the common center of gravity or inertial center of the recovery craft 1 together with the spacecraft 5 will always lie on the effective axis of the generated thrust vector of the thruster or thrusters 11.

Namely, the recovery craft 1 can simply tilt slightly, and the spacecraft 5 can pivot or swing, as the cable arrangement 10 allows such bending deflections, while the towing is being carried out. The cable arrangement 10 may also be embodied in an extendable manner, e.g. with a cable winch or the like, in order to allow an adjustable larger spacing distance between the recovery craft 1 and the spacecraft 5 that is to be recovered. As shown in FIG. 1, the spacing distance between the two spacecraft may be rather large, e.g. larger than the size of the recovery craft.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In a system for recovering and transporting a spacecraft, including a spacecraft that is to be recovered, a powered recovery craft, and a coupling arrangement adapted to couple said recovery craft to said spacecraft, an improvement in said coupling arrangement wherein said coupling arrangement comprises:
an interface ring provided on said spacecraft;
a coupling mast having first and second ends;
a releasable mount that releasably connects said first end of said coupling mast to said recovery craft;
at least three spreader arms movably connected to said coupling mast at or proximate to said second end of said coupling mast, wherein said spreader arms are adjustably movable relative to said coupling mast between a radially inwardly retracted condition and a radially outwardly extended condition, and wherein said spreader arms in said extended condition are adapted to engage said interface ring and thereby couple said coupling mast to said spacecraft; and
a spring arrangement that is provided on said second end of said coupling mast and that is arranged and adapted to elastically yieldingly brace against said spacecraft when said spreader arms are in said extended condition and engaged with said interface ring, so as to thereby press said spreader arms against said interface ring.

2. The improvement in the coupling arrangement in the system according to claim 1, wherein said interface ring includes a radially inwardly protruding rim with a recess on a side thereof facing said spacecraft, and free ends of said spreader arms in said extended condition reach into said recess and engage behind said protruding rim of said interface ring on said side thereof facing said spacecraft.

3. The improvement in the coupling arrangement in the system according to claim 1, wherein said spring arrangement comprises an elastic spring cone including at least three independently elastically deflectable cone segments separated from each other respectively by at least three slots.

4. The improvement in the coupling arrangement in the system according to claim 3, wherein said spreader arms in said retracted condition respectively are received in and extend through said slots of said spring cone.

5. The improvement in the coupling arrangement in the system according to claim 1, wherein said coupling mast comprises a telescoping pipe including an outer pipe and an inner pipe that is telescopically adjustably extendable from said outer pipe.

6. The improvement in the coupling arrangement in the system according to claim 5, further comprising pivot struts respectively having first strut ends pivotally connected to said outer pipe by respective first pivot joints and second strut ends pivotably connected to said spreader arms by respective second pivot joints, and wherein journalled ends of said spreader arms are pivotably connected to said inner pipe by respective third pivot joints.

7. The improvement in the coupling arrangement in the system according to claim 1, further comprising a collar that is selectively slidably displaceable axially along said coupling mast, and pivot struts respectively having first strut ends pivotably connected to said collar by respective first pivot joints and second strut ends pivotably connected to said spreader arms by respective second pivot joints, and wherein journalled ends of said spreader arms are pivotably connected to said coupling mast by respective third pivot joints.

8. The improvement in the coupling arrangement in the system according to claim 1, wherein said releasable mount is releasably secured to said recovery craft, and further comprising a cable arrangement that additionally connects said coupling mast to said recovery craft and that transmits purely tension forces between said coupling mast and said recovery craft when said releasable mount is released from said recovery craft.

9. The improvement in the coupling arrangement in the system according to claim 8, wherein said cable arrangement includes a cable winch and a tension cable that is selectively extendable from said cable winch.

10. The improvement in the coupling arrangement in the system according to claim 8, wherein explodable bolts are provided to releasably secure said releasable mount to said recovery craft.

11. The improvement in the coupling arrangement in the system according to claim 1, wherein said coupling arrangement has such an axially elongated extending length so that a distance between said spacecraft and said recovery craft coupled to each other is greater than a size of said recovery craft.

12. In a system for recovering and transporting a spacecraft, including a spacecraft that is to be recovered, a powered recovery craft, and a coupling arrangement adapted to couple said recovery craft to said spacecraft, an improvement in said coupling arrangement wherein said coupling arrangement comprises:
an interface ring provided on said spacecraft;
a coupling mast comprising a telescoping pipe including an outer pipe and an inner pipe that is telescopically adjustably extendable from said outer pipe, and having first and second ends;
a releasable mount that releasably connects said first end of said coupling mast to said recovery craft;
at least three spreader arms movably connected to said coupling mast at or proximate to said second end of said coupling mast, wherein said spreader arms are adjustably movable relative to said coupling mast between a radially inwardly retracted condition and a radially outwardly extended condition, and wherein said spreader arms in said extended condition are adapted to engage said interface ring and thereby couple said coupling mast to said spacecraft; and
pivot struts respectively having first strut ends pivotally connected to said outer pipe by respective first pivot joints and second strut ends pivotably connected to said spreader arms by respective second pivot joints, and wherein journalled ends of said spreader arms are pivotably connected to said inner pipe by respective third pivot joints.

13. In a system for recovering and transporting a spacecraft, including a spacecraft that is to be recovered, a powered recovery craft, and a coupling arrangement adapted to couple said recovery craft to said spacecraft, an improvement in said coupling arrangement wherein said coupling arrangement comprises:
an interface ring provided on said spacecraft;
a coupling mast having first and second ends;

a releasable mount that releasably connects said first end of said coupling mast to said recovery craft;

at least three spreader arms movably connected to said coupling mast at or proximate to said second end of said coupling mast, wherein said spreader arms are adjustably movable relative to said coupling mast between a radially inwardly retracted condition and a radially outwardly extended condition, and wherein said spreader arms in said extended condition are adapted to engage said interface ring and thereby couple said coupling mast to said spacecraft;

a collar that is selectively slidably displaceable axially along said coupling mast; and pivot struts respectively having first strut ends pivotably connected to said collar by respective first pivot joints and second strut ends pivotably connected to said spreader arms by respective second pivot joints;

wherein journalled ends of said spreader arms are pivotably connected to said coupling mast by respective third pivot joints.

14. In a system for recovering and transporting a spacecraft, including a spacecraft that is to be recovered, a powered recovery craft, and a coupling arrangement adapted to couple said recovery craft to said spacecraft, an improvement in said coupling arrangement wherein said coupling arrangement comprises:

an interface ring provided on said spacecraft;

a coupling mast having first and second ends;

a releasable mount that is releasably secured to said recovery craft to releasably connect said first end of said coupling mast to said recovery craft;

at least three spreader arms movably connected to said coupling mast at or proximate to said second end of said coupling mast, wherein said spreader arms are adjustably movable relative to said coupling mast between a radially inwardly retracted condition and a radially outwardly extended condition, and wherein said spreader arms in said extended condition are adapted to engage said interface ring and thereby couple said coupling mast to said spacecraft; and a cable arrangement that additionally connects said coupling mast to said recovery craft and that transmits purely tension forces between said coupling mast and said recovery craft when said releasable mount is released from said recovery craft, wherein said cable arrangement includes a cable winch and a tension cable that is selectively extendable from said cable winch.

15. The improvement in the coupling arrangement in the system according to claim 14, wherein explodable bolts are provided to releasably secure said releasable mount to said recovery craft.

* * * * *